United States Patent [19]

Engels et al.

[11] 4,183,676

[45] Jan. 15, 1980

[54] METHOD OF AND APPARATUS FOR GLUING WOOD CHIPS

[75] Inventors: Kaspar Engels; Helmut Müller, both of Mannheim, Fed. Rep. of Germany

[73] Assignee: Draiswerke GmbH, Mannheim, Fed. Rep. of Germany

[21] Appl. No.: 856,847

[22] Filed: Dec. 1, 1977

[30] Foreign Application Priority Data

Dec. 3, 1976 [DE] Fed. Rep. of Germany ....... 2654773
Jul. 14, 1977 [DE] Fed. Rep. of Germany ....... 2731767
Aug. 30, 1977 [DE] Fed. Rep. of Germany ....... 2738971

[51] Int. Cl.² .......................... B01F 5/04; B01F 7/04; B01F 15/02
[52] U.S. Cl. .................................... 366/172; 366/181
[58] Field of Search .............. 366/155, 165, 167, 168, 366/169, 172, 177, 150, 181

[56] References Cited

U.S. PATENT DOCUMENTS

| 3,163,403 | 12/1964 | Engels | 366/168 |
| 3,346,240 | 10/1967 | Lavelle | 366/168 |
| 3,734,471 | 5/1973 | Engels | 366/173 |
| 3,916,825 | 11/1975 | Schnitzler | 366/172 |

FOREIGN PATENT DOCUMENTS

| 2019483 | 11/1971 | Fed. Rep. of Germany | 366/176 |
| 2134305 | 1/1973 | Fed. Rep. of Germany | 366/176 |

*Primary Examiner*—Robert W. Jenkins
*Attorney, Agent, or Firm*—Browdy and Neimark

[57] ABSTRACT

An apparatus for continual gluing of wood chips includes a cylindrical mixture container, and a mixing shaft arranged within the container and substantially coaxially to a mixture ring of wood chips to be formed in the container. At least one glue supply pipe extends from the outside into the mixing chamber, ending with its outlet opening in the container. Each outlet opening lies in the surface of the inner wall of the mixing container. Glue is fed under substantially zero pressure to the outlet opening or openings. Wood chips in the outer periphery of the mixture ring serve to transport glue from the openings to the mixture ring.

13 Claims, 17 Drawing Figures

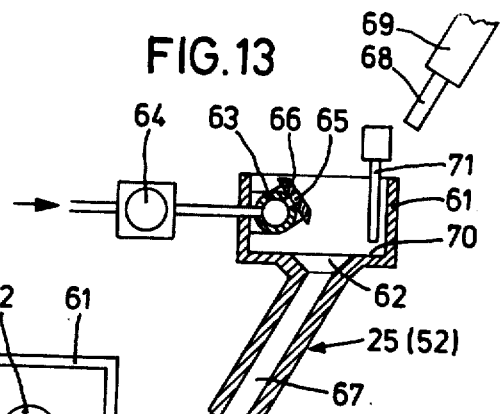
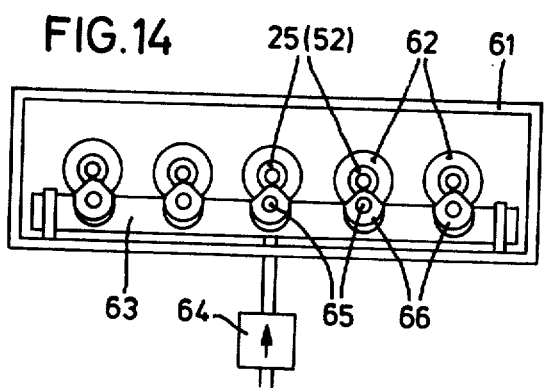
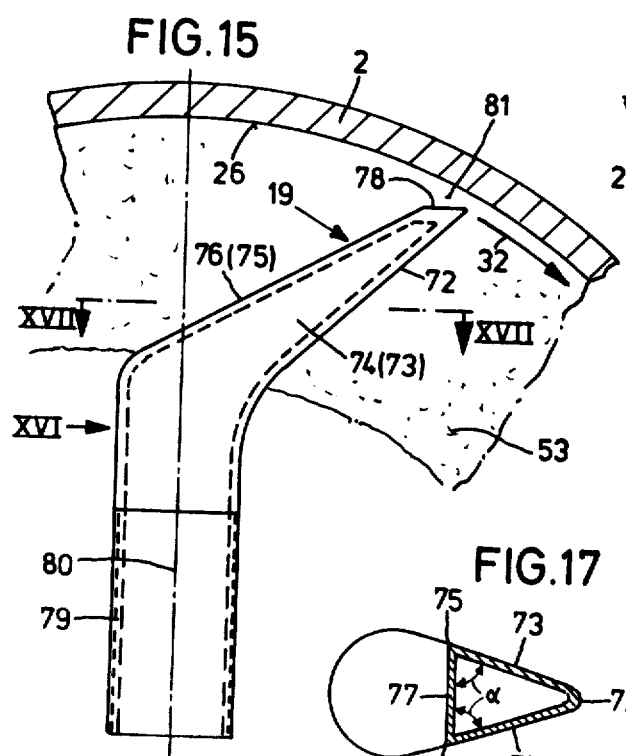
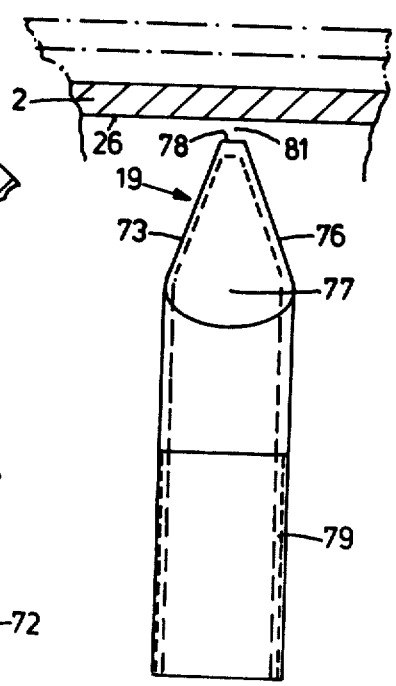

METHOD OF AND APPARATUS FOR GLUING WOOD CHIPS

BACKGROUND OF THE INVENTION

This invention concerns a method of and an apparatus for continually applying glue to wood chips which have been formed into the shape of a mixture ring. The invention relates, more particularly, to an apparatus for carrying out the method and which has a nearly horizontally arranged, cylindrical mixture container, in which a mixing shaft is arranged, which is provided with mixing tools and is driven at high speed coaxially to the chips, which have been formed into the mixture ring, a mixture feed support at one end of the mixture container, with a mixture outlet support at the other end of the mixture container and with at least one glue supply pipe, which is located on the mixture container, extends from the outside into the mixture container, and has its respective outlet opening inside the mixture container.

The above-mentioned type of method and apparatus is generally known from the German Federal Republic Offenlegungsschrift (Laid-Open Patent Application) No. 2,019,483, which discloses an apparatus for continually applying glue to wood chips. Spray jets are arranged in the mixture container, these jets projecting slightly into the interior of the mixture container. The spray jets are supplied with glue under pressure, which is then sprayed in the same direction into the interior of the mixture container, in which the wood chips move in the form of a ring of mixture material. In order to achieve this, the jets must project tangentially into the mixture container in the direction of rotation of the mixture ring. In order structurally to realize this, a radially extending recess is formed in the interior wall of the mixture container, out of which the respective spray jets project approximately tangentially to the interior wall of the mixture container. In the proximity of such a recess a dead space is thus formed, in which glue and wood chips can become deposited on the wall of the mixture container. These are loosened in an uncontrolled manner in the form of clumps, which leads to operational disturbances or malfunctions in the known apparatus and/or to malfunctions during later further working of the glued wood chips into chip board. Furthermore, the introduction of the glue under pressure to the spray jets can be problematic because an essential proper amount of glue under pressure can only be obtained at a substantial expense.

A mixing apparatus is known from United States Patent No. 3,163,403 for mixing of softener into a mixture of powered substances during formation of plastics, in which spray jets, to which the softener is supplied under pressure, are arranged in the mixture container wall, the outlet surfaces of the jets lying in the surface of the inner wall of the mixture container. This apparatus, however, has not been suitable to be used successfully for gluing wood chips.

The German Federal Republic Offenlegungsschrift (Laid-Open Patent Application) No. 2,134,305 discloses a method and an apparatus of the type described at the outset, in which the glue supply pipes end, together with their outlet openings, in the mixture ring, at a distance from the inner wall of the container. The glue is primarily supplied without pressure. A distinct disadvantage in this known method and apparatus is that the glue supply pipes are subjected to substantial wear by the chips, which move past it at high speed. In addition, glue undesirably collects in the area of these glue supply pipes and hardens, which can lead to operational malfunctions.

SUMMARY OF THE INVENTION

It is the principal object of the present invention to provide a method of and an apparatus for gluing wood chips in which an effective and a good distribution of the glue to the wood chips is maintained.

It is another object of the present invention to provide a method of and apparatus for gluing wood chips in which fouling of the mixture container is avoided.

The foregoing objects, as well as others which are to become apparent from the text below, are achieved in accordance with the present invention, in its method aspect, by providing that the glue is transferred practically under zero pressure to the wood chips at the outer periphery of the mixture ring.

In its apparatus aspect, the present invention achieves the objects by providing that the respective outlet openings of each glue supply pipe lies in the surface of the inner wall of the mixture container. Surprisingly, it has been shown, that when the glue is supplied under substantially zero pressure, that is at a maximum pressure corresponding to the static head of the standing glue to the mixture container at the surface of its inner wall, first of all, an at least equally good and, in many cases, better distribution of the glue on the surface of the wood chips is obtained as in the predominant and known methods and apparatus disclosed in U.S. Pat. No. 3,734,471 and in German Federal Republic Offenlegungsschrift (Laid-Open Patent Application) No. 2,134,305. In this manner a not-inconsequential savings of glue is obtained, because glue proportion necessary for a predetermined rigidity of the chip board to be produced is dependent on the quality of the distribution of the glue on the surface of the chips.

In addition, it has been shown, even more surprisingly, that although the glue runs practically on the inner wall of the mixture container, there is no fouling of the inner wall with glue. Wood chips of the type used for the production of chip board, usually consist of chips of varying sizes, namely, saw dust, fine chips, intermediate-sized chips, and large chips. Within a mixture ring there appears a certain fractionation, that is there is a certain radial distribution of the chips across the thickness of the mixture ring, whereby the large chips are found in an overproportional amount on the outside of the mixture ring, that is at the periphery. It has now been found that these primarily large wood chips moving at an extremely high relative speed of 10 to 20 meters/sec. along the inner wall of the mixture container take the glue that runs in under substantially zero pressure, operating much as scrapers, and fling it toward the interior into the mixture ring. These large chips thus partially effect the glue distribution, that is, they take over the job of special glue distributing tools, such as spray jets and the like. It is self-evident that with this type of arrangement of the glue supply pipes there can be no wear of the same, because they are not subjected to the flow of chips.

According to a special embodiment the one or more glue supply pipes are provided in respective inserts which have a cylinder-section shaped inner surface and are arranged in the mixture supply funnel. This embodiment adds an advantage, that the glue supply pipe or pipes do not have to penetrate the cooling cover of the mixture container which is usually present in this type of device. In the prior art methods and apparatus of this type, as a rule, technical finishing and operational problems result from the fact that the pipe or pipes penetrate the cooling cover. Especially significant in repair of the special embodiment of the present invention is that an exchange of the glue supply pipes is possible in a very simple manner. A further advantage is that for a given length of the mixture container, the post-mixing zone is in effect lengthened, where a further distribution of the glue over the surface of the chips can take place. This is made possible by a shortening the usually uncooled feed zone, where there is no mixing anyway, but where the wood chips are already being heated.

A further advantageous embodiment of the present invention is formed when a glue channel located in each glue supply pipe runs at least in the area of the associated radial plane of the mixture container. In this manner, virtually, any desired, usually radial, arrangement of the glue supply pipe can be used to feed the glue itself with a tangential component into the mixture container. Feeding may take place either in the direction of rotation of the mixture ring or, also advantageously, against its direction of rotation. It is especially advantageous when the glue channel, in the area of the associated outlet opening, has a bend opposite the center line of the glue supply pipe. In order to assure a nonspraying, substantially pressureless supply of the glue, it is also very advantageous when the cross-section area of an outlet opening is at least equal to the cross-section area of the associated glue channel. When several outlet openings are associated with a given glue channel, then this relation is valid for the sum total of the cross-section areas of the openings to the cross-section area of the glue channel.

BRIEF DESCRIPTION OF THE DRAWINGS

Further advantages and characteristics of the invention can be seen from the description of exemplary embodiments with the aid of the accompanying drawings.

FIG. 13 is a diagrammatic, partially in vertical cross section, view of a glue groove or trough for supplying the supply pipes with glue, which can be used in practicing the present invention.

FIG. 14 is a top view of the glue groove according to FIG. 13.

FIG. 15 is an illustration of a mixing tool for a mixer which can be used in the present invention, the tool being shown inside the mixing container.

FIG. 16 is a view of the mixing tool of FIG. 15 as seen in the direction of arrow XVI in FIG. 14.

FIG. 17 is a tangential cross-sectional view of the structure of FIG. 15, the section having been taken along section line XVII—XVII in FIG. 15.

DETAILED DESCRIPTION OF THE PREFERRED EMBODIMENTS

Figure 1:
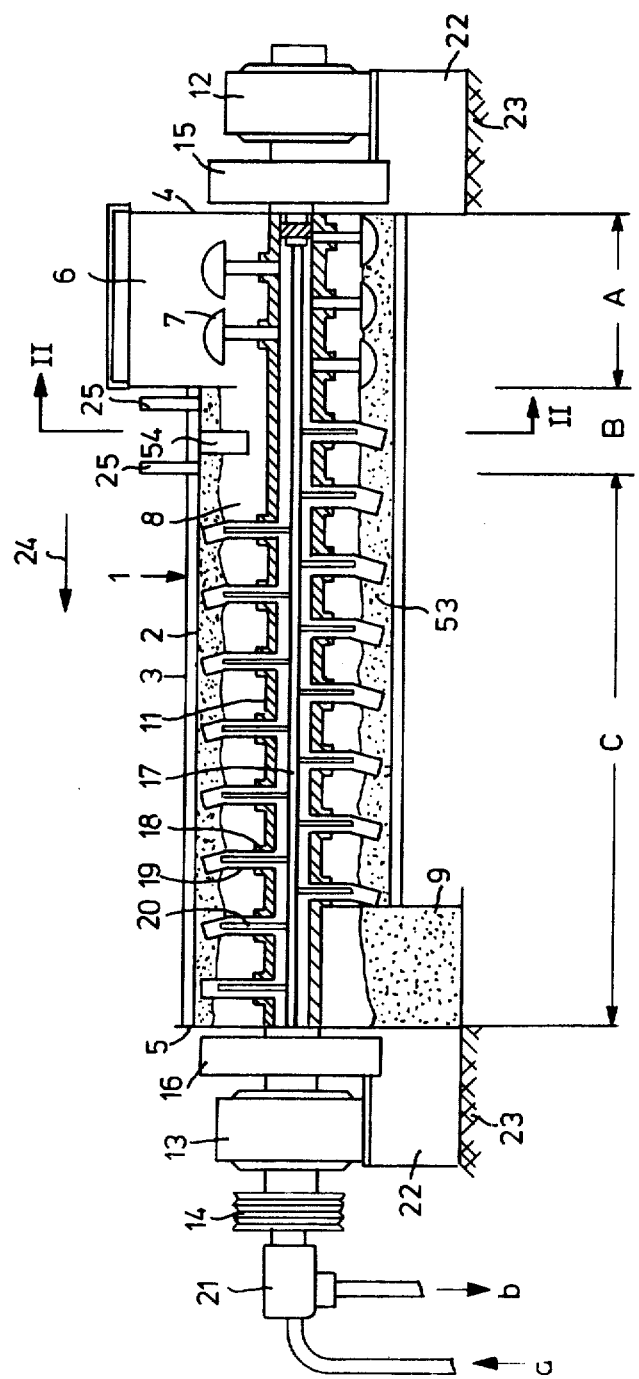
FIG. 1 is a somewhat diagrammatic view, in vertical center longitudinal cross section of a first exemplary embodiment of an apparatus for gluing wood chips in accordance with the present invention.
Figure 2:
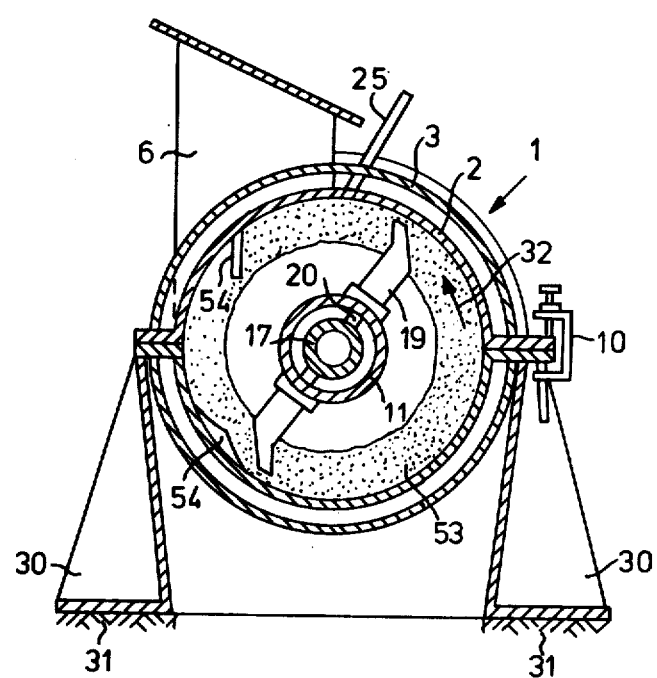
FIG. 2 is a vertical cross-sectional view of the apparatus of FIG. 1, the section having been taken along section line II—II.

The apparatus shown in FIGS. 1 and 2 has a cylindrical mixture container 1, which includes an inner vat 2 and a cooling manifold 3, surrounding the inner vat 2 and defining a cooling chamber. The mixture container 1 is closed on its ends by respective frontal walls 4, 5. At one end, the right end as shown in FIG. 1, of the mixture container 1, a mixture feed funnel 6 is provided, which communicates with an inner chamber 8 of the mixture container 1 that is enclosed by the inner vat 2 and the frontal walls 4 and 5. At the other end, the left end as shown in FIG. 1, a tangentially joining mixture outlet funnel 9 is provided. The mixture container 1 is divided in half horizontally, the two separable halves being held together by toggle lever locks 10. A mixing tool shaft 11 is coaxially arranged in the mixture container 1, which mixing tool shaft 11 is mounted in supports 12, 13, and is driven conventionally by a motor (not shown) via a V-belt pulley 14. Balancing discs 15, 16 are located on the mixing tool shaft 11. Inside of the mixing tool shaft 11 a coolant water supply pipe 17 is arranged and rotates therewith. Threaded liners 18 are located on the mixing tool shaft 11, into which hollow mixing tools 19 are screwed, formed as mixing arms. A coolant water pipe 20 branches off into each respective hollow mixing tool 19, so that coolant water flows through the coolant water supply pipe 17, the further coolant water pipes 20, through the inner chamber of each mixing tool 19 and into an annular chamber found between the coolant water supply pipe 17 and the mixing tool shaft 11. The coolant is supplied to the interior of the mixing tool shaft 11 by a coolant water connection 21, shown at the left in FIG. 1. The coolant water feed is designated by the letter a and the coolant water outlet is designated by the letter b. The mixture container 1 together with the supports 12, 13 is supported on a foundation 23 by a conventional machine frame 22.

Figure 3:
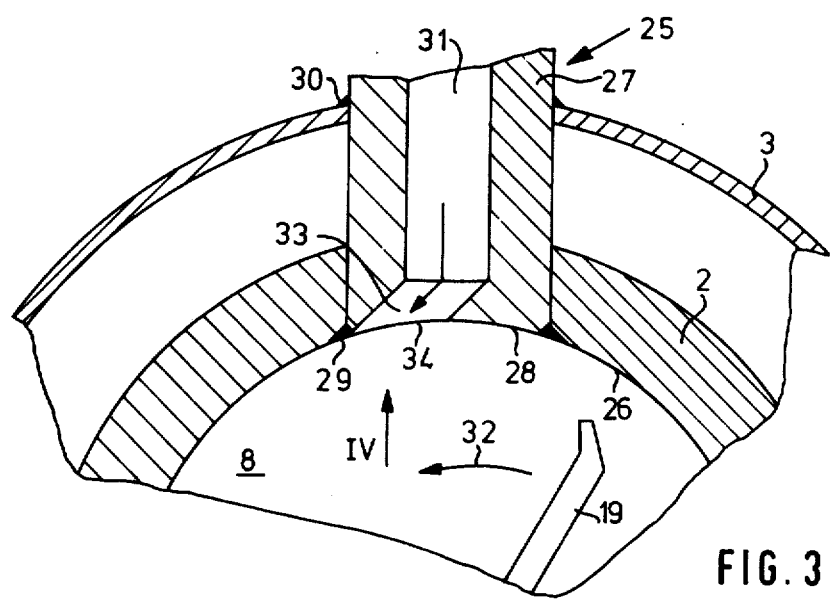
FIG. 3 is an enlarged view of a portion of the apparatus of FIG. 1, showing details of an embodiment of a glue supply pipe.
Figure 4:
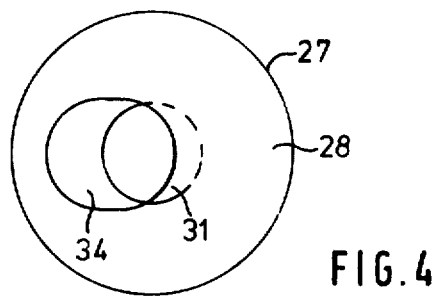
FIG. 4 is a view of the structure of FIG. 3 as seen in the direction of arrow IV in FIG. 3.
Figure 5:
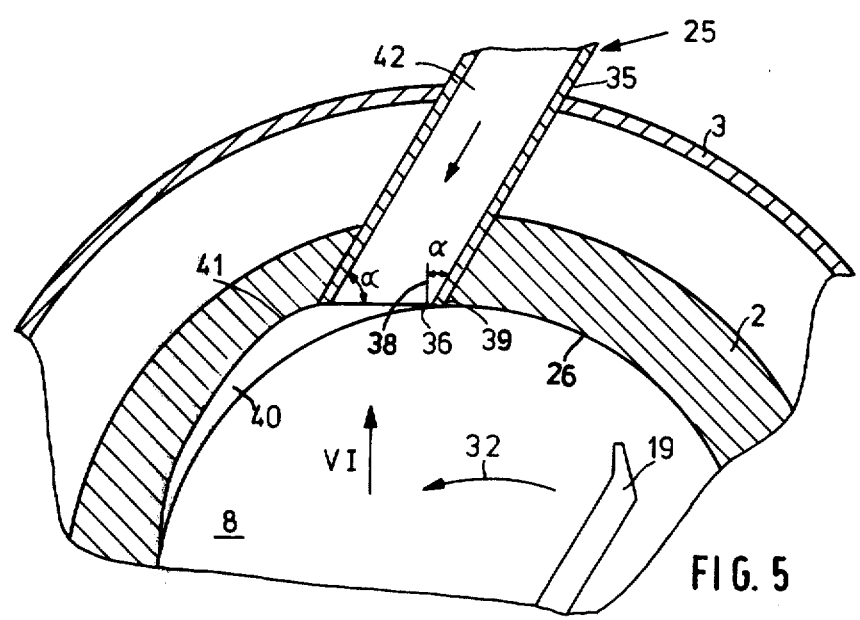
FIG. 5 is a view of a variant of the structure of FIG. 4, showing a further embodiment of a glue supply pipe.
Figure 6:
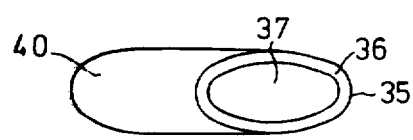
FIG. 6 is a view of the structure of FIG. 5 as seen in the direction of arrow VI in FIG. 5.

Glue supply pipes 25, two being visible in FIG. 1, are located directly behind the mixture feed funnel 6 and in communication with the inner chamber 8 of the container in the supply direction, designated by the arrow 24, of the mixture. The glue supply pipes 25 pass through the cooling chamber defined between the vat 2 and the manifold 3 and through the inner vat 2, as best seen in FIG. 2, and end flush with the inner wall 26 thereof. Various possible pipe arrangements are shown in the FIGS. 3 through 10. In the exemplary embodiment according to the FIGS. 3 and 4, the glue supply pipe 25 is formed by a thick-walled pipe 27, which is arranged radially to the mixing tool shaft 11 (FIG. 1) in corresponding recesses of the inner vat 2 and the manifold 3 defining a cooling chamber and whose frontal side 28 faces the inner chamber 8, runs flush with the inner wall 26 of the inner vat 2. The pipe 27 is connected, for example, with the inner vat 2 and through the cooling manifold 3 by means of welding seams 29, 30. The pipe 27 has a cylindrical glue channel 31 running radially to the mixing tool shaft 11 (FIG. 1) over the greatest portion of its length. The glue channel 31 has a bent section in the vicinity of the frontal side 28, the bend being in the direction of rotation 32 of the mixing tool 19. This bent section ends in an elliptical outlet opening 34, because the cross section of this bent section 33 is also circular. In this embodiment of the glue channel 3, with its bent section 33, glue supplied therethrough flows out of the outlet opening 34 already having a tangential component, a very desirable achievement.

In the exemplary variant according to the FIGS. 5 and 6, a pipe 35 again serves as the glue supply pipe 25, which, however, has a substantially smaller wall strength. The pipe 35 has a cut inner frontal side 36 of less than an angle of 90°, so that an elliptical outlet opening 37 is formed. The pipe 35 is inclined by the same angle α opposite a radial plane 38, beneath which runs the frontal side 36 at an angle of the cover lines of the pipe 35. The frontal side 36 of the pipe 35 is arranged in such a manner that it lies flush with the inner wall 26 at the point of penetration 39 lying forward in the direction of the rotation designed by the arrow 32. Because of the similarity of the angle α of the frontal side 36 and of the inclined angle α of the pipe 35 as opposed to the radial plane 38, the frontal side 36 runs tangentially to the inner wall 26 at its point of penetration 39, beginning at the first point of penetration in the direction of rotation designated by the arrow 32.

A trough-shaped recess 40 is worked into the inner vat 2, which recess begins tangentially from an end 41 of the frontal side 36 of the pipe 35 lying rearward in the direction of rotation designated by the arrow 32, and ends again tangentially to the inner wall 26 after a continual curve. In this embodiment, the glue channel 42 in the pipe 35 runs over its full length with a tangential component in the direction of rotation designated by the arrow 32.

Figure 7:
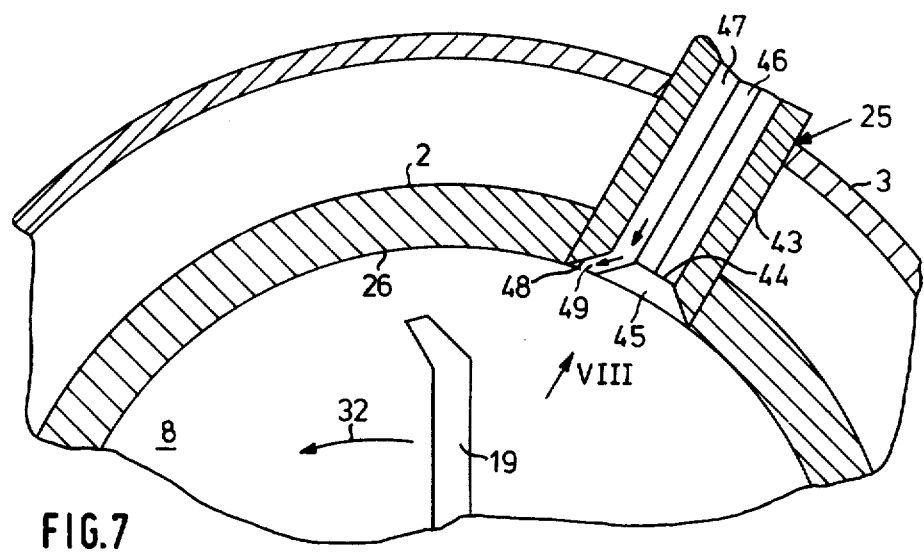
FIG. 7 is a view of a further variant of the structure of FIG. 4, showing a further embodiment of a glue supply pipe.
Figure 8:
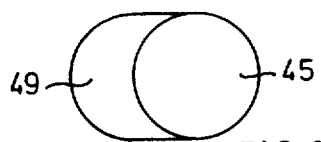
FIG. 8 is a view of the structure of FIG. 7 as seen in the direction of arrow VIII in FIG. 7.

In the exemplary variant according to the FIGS. 7 and 8, a thick-walled pipe 43 is again provided, which runs radially to the mixing tool shaft 11 (FIG. 1) and which ends flush with the inner wall 26 of the inner vat 2. At its inner end, this pipe 43 is provided with a truncated conical seat surface 44, which tapers away from the inner chamber 8, against which seat surface 44 a corresponding truncated conical closing plate 45 is supported, which is attached to a rod 46. This rod 46 extends outward through the pipe 43, so that an annular glue channel 47 is formed therein. At the end lying rearward in the direction of rotation designated by the arrow 32, the pipe 43 is provided with an additional recess 48 which runs at an angle to its longitudinal axis, so that an outlet opening 49 is formed, the opening 49 being formed by a half-ellipse and a half-circle (FIG. 8). The seat surface 44 thus also extends only over about 180°. The cross-section surface of the outlet opening 49 is equal or somewhat larger than the cross-section surface of the annular glue channel 47 in the pipe 43. In this variant, too, glue supplied through the glue channel 47 and the recess 48 is fed in with a tangential component in the direction of rotation designated by the arrow 32.

Figure 9:
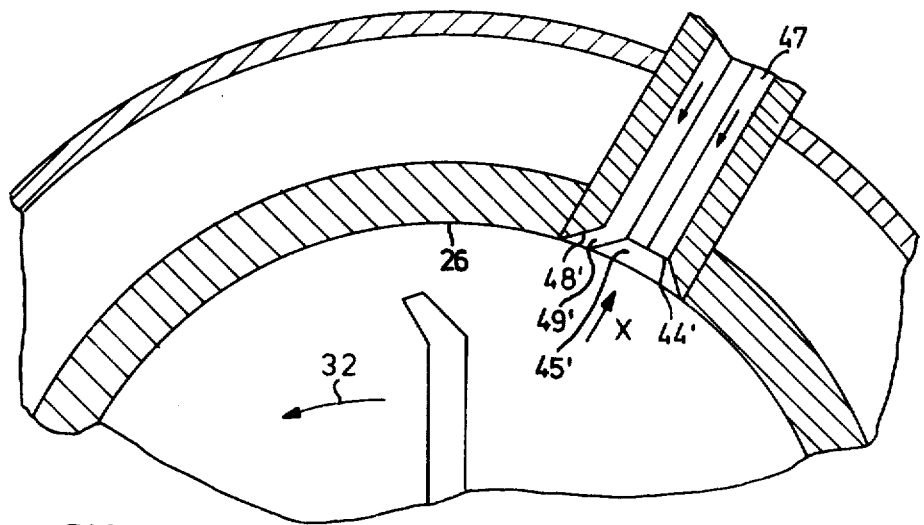
FIG. 9 is a view of an additional variant of the structure of FIG. 4, showing an additional embodiment of a glue supply pipe.
Figure 10:
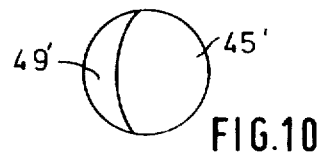
FIG. 10 is a view of the structure of FIG. 9 as seen in the direction of arrow X in FIG. 9.

The variant according to the FIGS. 9 and 10 is distinguished from the variant according to the FIGS. 7 and 8 only in that the seat surface 44' extends over its full circumference angle of 360°, while the closing plate 45' has a large cut taken out on the side lying rearward in the direction of rotation designated by the arrow 32, so that here again an outlet opening 49' is formed. In this manner the thus-formed recess 48' in the connection to the glue channel 47 has a tangential component in the direction of rotation designated by the arrow 32, which corresponds to the opening angle of the seat surface 44'.

Figure 11:
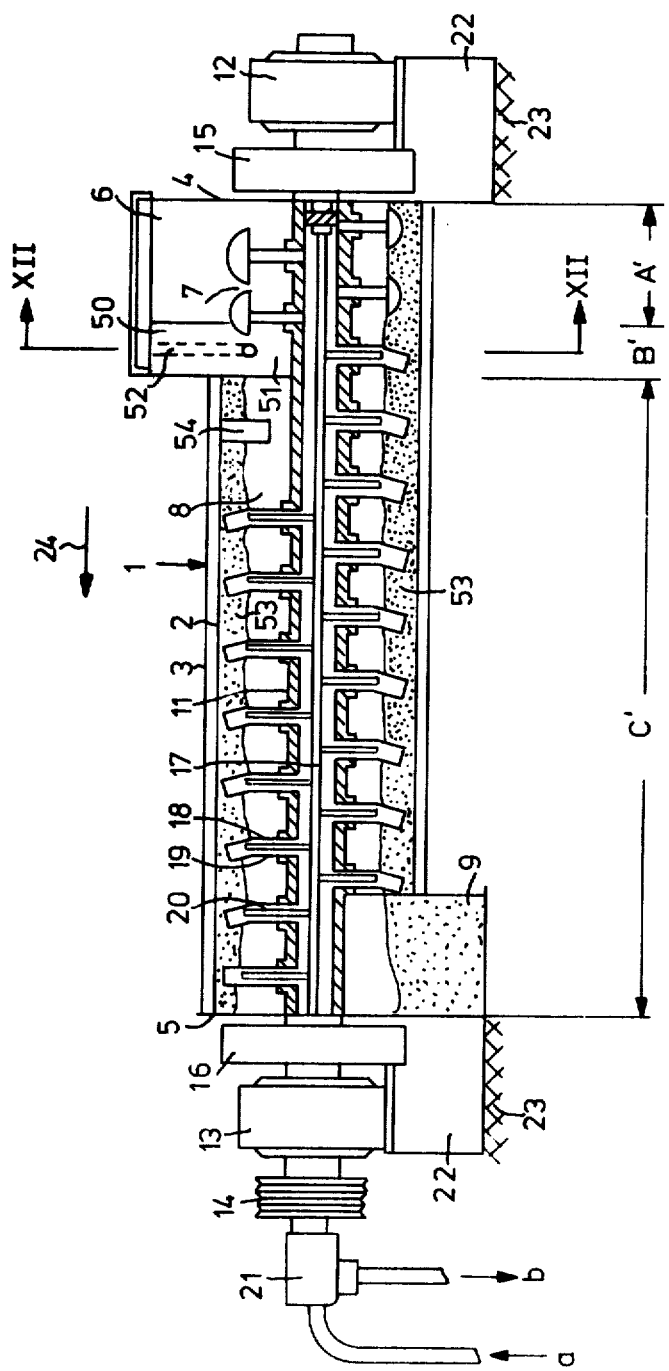
FIG. 11 is a somewhat diagrammatic view, in vertical center longitudinal cross section of a second exemplary embodiment of an apparatus for gluing wood chips in accordance with the present invention and provided with a modification of the glue supply pipe.
Figure 12:
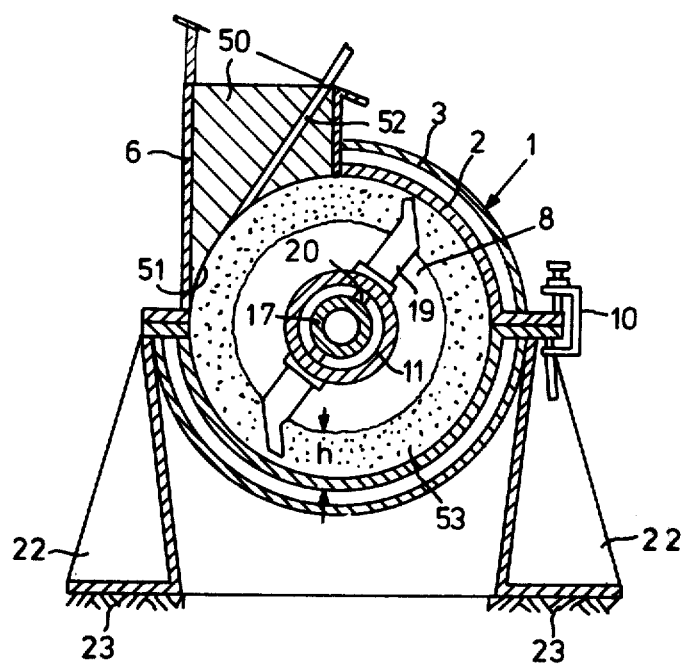
FIG. 12 is a vertical cross-sectional view of the apparatus of FIG. 11, the section having been taken along section line XII—XII in FIG. 11.

The exemplary embodiment according to the FIGS. 11 and 12 is distinguished from the embodiment according to the FIGS. 1 and 2 only in that the glue supply pipes are not located on the mixture container 1, i.e. do not penetrate the cooling manifold 3 and the inner vat 2. Rather, here an insert 50 is provided, which is placed within the mixture supply funnel 6, at the side thereof lying to the rear relative to the supply direction designated by the arrow 24. In the tangential direction, the insert 50 completely fills the mixture supply funnel 6, as seen in FIG. 12. It has a cylinder-section shaped inner surface 51, whose curvature is the same as the curvature of the inner wall 26 of the inner vat 2, so that this inner surface 51 is practically a part of a cylinder which opens through the inner wall 26. A glue supply pipe 52 is located in the insert 50, so as to lead either sideways or upward out of the mixture supply funnel 6. An embodiment of the glue supply pipe 52 and its arrangement relative to the mixture container 1 can be exactly as is shown in and described above relative to FIGS. 3 through 10, which are referred to to that extent. The difference, in each case, is simply that of where the pipe or pipes are located with respect to the funnel 6 and inner vat 2. Of course, a plurality of this type of glue supply pipes 52 can be located in the insert 50, each having possible structures as shown in FIGS. 3–10. By using the insert 50, a mixture supply opening 7' is formed, which tapers corresponding to its length.

Referring to FIGS. 1 and 11, the portion of the mixture container 1 where the mixture supply opening 7 or 7', as the cases may be, extends in the long direction of the mixture container 1, forms a draw-in zone A or A'. In the draw-in zone A or A' the mixture, which consists of wood chips of various sizes and is fed through the mixture supply funnel 6, is tangentially accelerated so strongly by the shovel-like ring-forming draw-in tools 19, that a mixture ring is formed on the inner wall 26, i.e. on the inner surface 51 and the inner wall 26 of the inner vat 2. In order to make possible this formation of a mixture ring 53, the mixture shaft 11 is driven far above the critical rpm. The critical rpm is defined as the rpm where radial accelerations appear at the extreme ends of the mixing tools 19 which are equal to the acceleration of gravity. The critical rpm can be expresses in a formula as follows:

$$n_{Crit} = 42.3 \cdot \sqrt{D},$$

whereby D is equal to the diameter of the inner vat. The long portion of the mixture container 1, i.e. of the insert 50 that joins the draw-in zone A or A', where the supply pipes 25 or 52 are arranged, forms a liquid (glue) adding zone B or B'. The portion following this is a post mixing zone C or C'.

As can be seen from FIG. 1, turning members 54 can be provided on the inner wall 26 of the inner vat 2, which have running surfaces that point radially inward in the direction of rotation 32. This type of turning members 54 are schematically shown in cross section in FIG. 2. They impart a radially inward directed movement component to the mixture rotating in the direction of rotation designated by the arrow 32, and thereby lead to a radial changing or shifting of the individual chips of the mixture.

Similarly to the glue supply pipes 25 or 52, the turning members 54 can also be arranged to provide a radial component against the direction of rotation designated by the arrow 32.

The practically pressureless supply of the glue to the glue supply lines 25 or 52 can proceed in the manner described below.

As can be seen from the FIGS. 13 and 14, a horizontal vat-shaped glue trough 61 is attached to the glue supply pipes 25 or 52 in such a manner that an upper opening 62 of each glue supply pipe 25 or 52 is open toward the inner chamber of the glue trough 61.

A glue distributor pipe 63 is arranged in the glue trough 61, to which glue is supplied by means of a dosing pump 64. This glue flows into the glue trough 61 through outlet openings 65 which are arranged over the length of the glue distributing pipe 63 or the glue trough 61, are found in the upper half of the glue distributing pipe 63, and face the glue supply pipes 25 or 52. In this manner at least one outlet opening 65 is directly associated with each glue supply pipe 25 or 52 in the axis direction of the mixture container 1. The glue flowing out of the outlet openings 65 flows directly into the openings 62 through trough sheets 66 and thereby through the associated glue supply pipe 25 or 52 into the mixture ring 53. These trough sheets 66 are located on the glue distributor 63, are associated with the individual glue supply pipes 25 or 52 and point downward. Each trough sheet 66 ends vertically above the neighboring area of the associated opening 62. When the dosing pump 64 is turned off, the pulsing inflow of glue from the glue distributing pipe 63 is discontinued.

The glue distributing pipe 63 is arranged on the side inside of the glue trough 61 and does not overlap with the cylinder that is fixed through the inner chamber 67 of each glue supply pipe 25 or 52, so that a cleaning rod 68 can be pushed in from above past the glue distributing pipe 63 and into the glue supply pipe 25 or 52, in order to clean its inner surface defining the channel 67 over its full length of dried glue accumulations and the like, without hinderance from the glue distributing pipe 63 or the trough sheets 66. In this manner a cleaning of the glue supply pipe 25 or 52 can be periodically performed without interrupting operation. This type of cleaning rods 68 can also be installed permanently and be activated by a hydraulic or pneumatic operating cylinder 69.

An overflow sensor 71 is arranged above the bottom 70 of the glue trough 61, which gives a signal when the glue in the glue trough 61 stops flowing, and can turn off the dosing pump 64 and the motor. When this type of glue stoppage occurs in the glue trough 61, it is a signal that at least several glue supply pipes 25 or 52 are clogged, and that the glue supplied by the dosing pump 64 cannot be brought into the mixture of the mixture ring 53 through the still free glue supply pipes 25 or 52.

Details of the structure of the cooled mixing tools 19 is shown in the FIGS. 15 through 17. The mixing tool 19 is bent toward the inner wall 26 in the direction of rotation designated by the arrow 32 by about 35° to 60° relative to the radius, that is, bent so as to be forward pointing. As seen in FIGS. 15 and 16, the tool 19 is bent in the radial plane, and tapers in the associated axial plane. As seen in FIG. 17, the mixing tool 19 has in tangential section a somewhat parabella-shaped cross section, whereby its vertical line (zenith line) 72 runs in the direction of rotation designated by the arrow 32. The mixing surfaces 73, 74 extend backwards against the direction of rotation designated by the arrow 32 and are symmetrical to each other. Each surface 73, 74 ends in a respective breaking edge 75, 76, which run symmetrically to one another and thereby border a rear surface 77, which is somewhat more sharply inclined, in the direction of rotation designated by the arrow 32 because of the tapering to the mixing tool 19, than is the leading zenith line 72. Because the breaking edges 75, 76 are straight, the rear surface 77 is a plane. If the breaking edges 75, 76 are formed to run bent slightly outward according to a vary large bend radius, the rear surface 77 is a cylinder-segment surface with a correspondingly large bend radius.

The mixing surfaces 73, 74 and the rear surface 77 are bordered by an outer surface 78 at the radial outer, strongly tapered end of the mixing tool 19. This outer surface 78 runs vertically to an axial plane 80 which extends through a shaft 79 which stands radially outward from the mixing tool shaft 11. The shaft 79 is screwed into the threaded liner 18. A narrow cleft 81 is formed between this outer surface 78 and the inner wall 26 of the inner vat 2, which cleft becomes slightly larger in the opposite direction from the direction of rotation designated by the arrow 32, because the radially outer end of the mixing tool 19 moves in front of the axial plane 80 through the shaft 79.

As can be seen from FIG. 17, the angle α between the mixing surfaces 73 or 74 and the rear surface 77 is relatively blunt. It is approximately 60° to 80°.

The foregoing description and accompanying sheets of drawing relate to embodiments and variants of the present invention set out by way of example, not by way of limitation. It is to be appreciated that numerous other embodiments and variants are possible without departing from the spirit and scope of the invention, its scope being defined in the appended claims.

What is claimed is:

1. In an apparatus for continual gluing wood chips, which apparatus includes a substantially horizontally arranged, cylindrical mixture container, a mixing shaft arranged within the container substantially coaxially to a mixture ring of wood chips which is to be formed in the container, a mixture feed support at a first end of the mixture container and a mixture outlet support at a second end of the mixture container, and glue supply means including at least one glue supply pipe located on the mixture container, the pipe extending from outside into the mixture container and ending with its respective outlet opening in the mixture container, the improvement wherein said glue supply means comprises means to feed glue under substantially zero pressure including an upwardly open glue trough in which at least one glue distributing pipe empties, each said glue supply pipe being fed from said trough and the outlet opening of each said glue supply pipe lying in a surface of an inner wall of said mixture container.

2. An improved apparatus according to claim 1, including feed funnel and an insert, and wherein said at least one glue supply pipe is provided in said insert, and said insert is arranged in said feed funnel and has a substantially cylinder-section shaped inner surface forming a part of the cylindrical wall of mixture container at its first end.

3. An improved apparatus according to claim 1, wherein a respective glue channel formed in each said glue supply pipe runs at least in the vicinity of its said respective outlet opening at an angle less than 90° to a radial plane of said mixture container.

4. An improved apparatus according to claim 3, wherein each said glue channel is bent in the vicinity of its said respective outlet opening relative to a center line of its associated said glue supply pipe.

5. An improved apparatus according to claim 1, wherein each said pipe defines within a respective glue channel, and each said outlet opening has a cross-sectional area at least equal to the cross-sectional area of its associated said respective glue channel.

6. An improved apparatus according to claim 1, wherein said at least single glue distributing pipe is arranged next to openings of said glue supply pipes which join said glue trough.

7. An improved apparatus according to claim 6, including a respective cleaning rod provided above respective openings of each said glue supply pipe which rods can be pushed into said glue supply pipes.

8. An improved apparatus according to claim 1, wherein said outlet openings of said at least one glue distributing pipe are arranged in an upper half thereof.

9. An improved apparatus according to claim 1, including a trough sheet extending from each said outlet opening in said distribution pipe up to a point which is vertically above at least a border of said at least one glue supply pipe.

10. An improved apparatus according to claim 1, including an overflow sensor arranged in said glue trough above its bottom.

11. In an apparatus for continual gluing wood chips, which apparatus includes a substantially horizontally arranged, cylindrical mixture container, a mixing shaft arranged within the container substantially coaxially to a mixture ring of wood chips which is to be formed in the container, a mixture feed support at a first end of the mixture container and a mixture outlet support at a second end of the mixture container, and at least one glue supply pipe located on the mixture container, the pipe extending from outside into the mixture container and ending with its respective outlet opening in the mixture container, the improvement wherein said respective outlet opening of each said glue supply pipe lies in a surface of the inner wall of said mixture container;

a respective glue channel formed in each said glue supply pipe runs at least in the vicinity of its said respective outlet opening at an angle to a radial plane of said mixture container;

each said glue channel is bent in the vicinity of its said respective outlet opening relative to a center line of its associated said glue supply pipe;

wherein each said glue channel is directed against the direction of rotation of the mixture ring at least in the vicinity of its associated said respective outlet opening.

12. In an apparatus for continual gluing wood chips, which apparatus includes a substantially horizontally arranged, cylindrical mixture container, a mixing shaft arranged within the container substantially coaxially to a mixture ring of wood chips which is to be formed in the container, a mixture feed support at a first end of the mixture container and a mixture outlet support at a second end of the mixture container, and at least one glue supply pipe located on the mixture container, the pipe extending from outside into the mixture container and ending with its respective outlet opening in the mixture container, the improvement wherein said respective outlet opening of each said glue supply pipe lies in a surface of the inner wall of said mixture container; and further including at least one mixing tool formed to taper radially outward, arranged against direction of rotation of said mixing shaft, and bordered by two symmetrically running mixing surfaces and a rear surface, and wherein said mixing surfaces each have a breaking edge at a transition point to a rear surface which is formed as a planar surface.

13. An improved apparatus according to claim 12, wherein an angle between said mixing surfaces and said rear surface is in the range of from about 60° to about 80°.

* * * * *